United States Patent [19]

Mauron

[11] 3,911,535
[45] Oct. 14, 1975

[54] BLOCKING DEVICE FOR A VEHICLE BELT
[75] Inventor: Gerard Mauron, Versailles, France
[73] Assignees: Automobiles Peugeot, Paris; Regie Nationale des Usines Renault, Boulogne-Billancourt, both of France
[22] Filed: Nov. 29, 1974
[21] Appl. No.: 528,571

[30] Foreign Application Priority Data
Dec. 3, 1973  France .............................. 73.43041

[52] U.S. Cl. .................. 24/170; 24/134 N; 24/133; 297/389
[51] Int. Cl.² ................... A44G 11/06; A47C 31/00
[58] Field of Search ........... 24/134 N, 134 KC, 191, 24/170, 133; 280/150 SB; 297/389

[56] References Cited
UNITED STATES PATENTS
| | | | |
|---|---|---|---|
| 1,320,600 | 11/1919 | Bush | 24/134 N |
| 3,823,978 | 7/1974 | Dove | 297/388 |
| 3,847,434 | 11/1974 | Neman | 280/150 SB |

Primary Examiner—Bernard A. Gelak
Attorney, Agent, or Firm—Burns, Doane, Swecker & Mathis

[57] ABSTRACT

The safety belt blocking device comprises two pairs of links constituting an articulated parallelogram arrangement interconnecting a fixed member fixed to a support and a movable member between which members the safety belt extends. The links are operative to increase the clamping effect of the movable member on the belt when clamping has been initiated. Supplementary guide means, along which, and a contact with which, the belt is movable, are pivoted in one part to the support and in another part to the movable member. A spring biases the guide means in such manner as to transversely deviate the belt and the latter thus defines a zig-zag line so that, under the effect of a pull exerted on the belt, the belt urges back the guide means in opposition to the action of the spring and the guide means brings the movable member to its clamping position against the belt.

5 Claims, 4 Drawing Figures

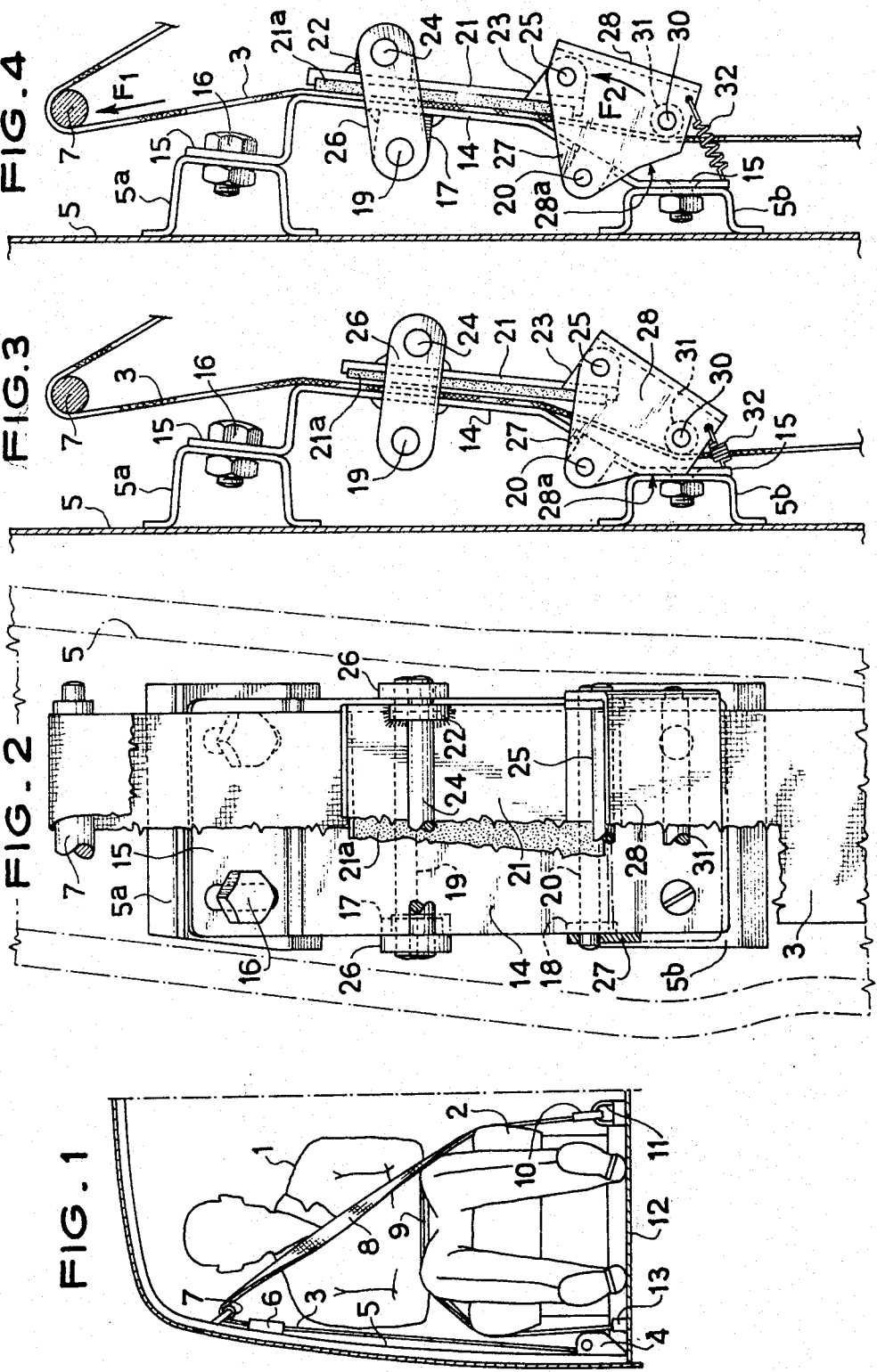

BLOCKING DEVICE FOR A VEHICLE BELT

The present invention relates to a blocking device in particular for a safety belt associated with an automatic winder and employed for retaining a vehicle occupant on his seat.

When a belt is associated with an automatic winder adapted to allow great freedom of movement to the user, it is known that an effective blocking device must be provided which operates immediately in the case of a sudden deceleration of the vehicle.

When this blocking device is incorporated in the winder, the shaft of the latter must be particularly strong in order to withstand the forces created at the moment of shock. Moreover, the taking up of the slack in the part of the belt which is still wound on the winder produces a delay which does not permit a sufficient limitation of the forward movement of the occupant of the seat so that there is a danger of the occupant striking the windshield.

In order to overcome this drawback, devices have been proposed which block the belt directly by clamping. But the known devices either ensure an excessively localized clamping with a wedging effect, which very often breaks the belt, or include electromagnets, which increases the price and the danger of malfunctioning.

An object of the present invention is to ensure a particularly effective blocking of the belt by a device which is completely mechanical in construction, particularly simple and very reliable in operation.

According to the invention, there is provided a blocking device of the type comprising a fixed member and a movable member between which members the belt is slidable, said members being connected by articulated links arranged to bring about an increase in the clamping of the belt when the clamping has been initiated.

The device according to the invention comprises a supplementary guide means along which the belt passes, said guide means being pivoted to a fixed support and connected to the movable member and being normally maintained by resiliently yieldable means in such position that the belt is deviated and defines a broken line so that under the effect of a traction exerted on the belt, the belt becomes taut and urges back the guide means in opposition to the resiliently yieldable means, the guide means then bringing the movable member to its beltclamping position.

In a preferred embodiment, the guide means is carried by at least one of the pivotal links between the two members. With this arrangement, the device is very simple in construction and has a considerably enhanced efficiency.

An embodiment of the invention will now be described in more detail with reference to the accompanying drawing in which:

FIG. 1 is a diagrammatic view of a safety belt provided with a blocking device according to the invention in the position of utilisation of the belt;

FIG. 2 is a front elevational view, with a part cut away, of the blocking device;

FIG. 3 is a side elevational view to an enlarged scale of the blocking device in the normal position of utilisation;

FIG. 4 is similar to FIG. 3, the blocking device being in its operative position, that is to say ensuring the blocking of the belt.

FIG. 1 shows the arrangement of a safety belt employed for maintaining a vehicle passenger 1 on his seat 2.

The safety belt comprises a first portion 3 one end of which is connected to a winder 4 secured to the lower part of an adjacent lateral post 5 of the vehicle. The winder comprises in the known manner a resiliently yieldable return means (not shown) adapted to exert a permanent traction on the belt 3. Starting at the winder 4, the belt 3 passes through a blocking device 6 according to the invention which is secured, in the presently-described embodiment, in the vicinity of the upper part of the post 5. It then passes through a ring 7, also secured to the post 5, before extending diagonally in a portion 8 in front of the chest of the passenger 1, thereby constituting a shoulder- or cross-belt.

The belt also has a second portion 9 constituting a lap belt or strap which is connected at one end to the free end of the portion 8 through a loop or ring 10 for securing it to an anchoring means 11 secured to the floor 12. The other end of the lap belt 9 is secured, on the other side of the passenger 1 and seat 2, to an anchoring means 13 also secured to the floor 12.

The blocking device 6 comprises a member 14 having two tabs 15 by which it is secured by screws 16 to reinforcing elements 5a and 5b of the post 5. The member 14 carries an upper fork device 17 and a lower fork device 18 in which pins 19 and 20 are mounted. The blocking device 6 further comprises a movable member 21 which carries on its inner surface facing the member 14 a layer 21a of a material having a high coefficient of friction, for example bonded or vulcanized rubber. The member 21 also carries an upper fork device 22 and a lower fork device 23 in which pins 24 and 25 are mounted.

The members 14 and 21 are interconnected, on one hand, by upper or front links 26 pivotally mounted on the pins 19 and 24 and, on the other, by lower or rear links 27 pivotally mounted on the pins 20 and 25. The pins 19, 20, 24 and 25 define an articulated parallelogram structure so that the movable member 21 always remains parallel with the fixed member 14.

The lower links 27 are integrated into a control fork 28 which has a pin 30 parallel to the pins 24 and 25, a roller 31 being rotatably mounted on the pin 30 and the portion 3 of the belt passing around this roller. Springs 32 exert on the fork device 28 a tilting torque about the pin 20 so that the surface 28a of the device 28 is brought into abutment with the reinforcing element 5b of the post 5. In this position, the links 26 and 27 are roughly perpendicular to the members 14 and 21, the space between the latter two elements being maximum and the portion 3 of the belt which is deformed by the roller 31 forming a broken or zig-zag line and being applied flat against the member 14.

The blocking device just described operates in the following manner:

In the normal position of utilisation shown in FIG. 3, the portion 3 of the belt which does not bear on the layer 21a having a high coefficient of friction, freely slides along the member 14 and rotates the roller 31 on its pin 30.

When in the course of an accident the passenger 1 is projected violently forwardly, a high traction force is exerted in the direction of arrow F1 (FIG. 4) on the portion 3 of the belt. The angle that the latter makes on the roller 31 then produce a component which tends to rotate the fork device 28 about the pin 20 in the direction of arrow F2 (FIG. 4).

This movement pivots the links 26 and 27 and causes the member 21 to be applied flat against the member 14. Owing to the high coefficient of friction between the belt and the layer 21a, any tendency on the part of the belt portion 3 to move only increases the clamping thereon and a particularly effective blocking is achieved. On the other hand, the release of the belt, after operation of the device, is easy owing to the fact that this release occurs by the sliding of the belt on the member 14 which slides the movable member 21 in the direction in which it moves away from the member 14.

The desired result is therefore achieved in a very effective manner with no use of complicated and costly means.

Having now described my invention what I claim as new and desire to secure by Letters Patent is:

1. A blocking device for a belt and in particular a vehicle safety belt, the device comprising a support, a fixed member fixed relative to the support and a movable member movable between a first position in which it is spaced sufficiently away from the fixed member to allow the belt to move longitudinally freely between said members and a second position in which the movable member clamps the belt against the fixed member, an arrangement of articulated links, pivotally interconnecting said members in such manner as to result in an increased clamping of the movable member against the belt when the clamping has been initiated, supplementary guide means along which and in contact with which guide means the belt is movable, said guide means being pivotable relative to the support and operatively connected to the movable member, and resiliently yieldable means for normally maintaining the guide means in such position that the belt is transversely deviated and longitudinally defines a broken line so that under the effect of a traction exerted on the belt which renders the belt taut, the belt urges back the guide means in opposition to the action of the resiliently yieldable means, the operative connection of the guide means to the movable members being such that the guide means is capable of bringing the movable member to said second position when urged back by the belt.

2. A device as claimed in claim 1, wherein the guide means is carried by one of the articulated links pivotally interconnecting the two members.

3. A blocking device for a belt and in particular a vehicle safety belt, the device comprising a support, a fixed member fixed relative to the support and a movable member movable between a first position in which it is spaced sufficiently away from the fixed member to allow the belt to move longitudinely freely between said members and a second position in which the movable member clamps the belt against the fixed member, a first pair of links and a second pair of links which are at the rear of the first pair of links with respect to the direction of the force of traction exerted on the belt in belt use, the first pair of links having one end pivotally mounted relative to the support and an opposite end pivoted to the movable member, the second pair of links having one end pivotally mounted relative to the support and an opposite end pivoted to the movable member, the two pairs of links being operative to result in an increased clamping of the movable member against the belt when the clamping has been initiated, supplementary guide means along which and in contact with which guide means the belt is movable, said guide means being associated with the rear pair of links, and resiliently yieldable means for normally maintaining the guide means in such position that the belt is transversely deviated and longitudinally defines a broken line so that under the effect of a traction exerted on the belt which renders the belt taut, the belt urges back the guide means in opposition to the action of the resiliently yieldable means, the guide means being positioned relative to the second pair of links to be capable of bringing the movable member to said second position when urged back by the belt.

4. A device as claimed in claim 2, comprising a fork device having two branches which are pivotally mounted by two parallel pins respectively on the fixed member and on the movable member, the guide means being mounted on the branches.

5. A device as claimed in claim 4, wherein said fork device comprises at least one abutment surface which cooperates with a support surface for determining the first position of the movable member.

* * * * *